Sept. 10, 1935.    R. D. MERSHON    2,014,004
TERMINAL FOR ELECTROLYTIC CONDENSERS AND RECTIFIERS
Filed Dec. 4, 1931

INVENTOR
R. D. Mershon
BY
Cooper, Kerr & Dunham
ATTORNEYS

Patented Sept. 10, 1935

2,014,004

UNITED STATES PATENT OFFICE 2,014,004

TERMINAL FOR ELECTROLYTIC CONDENSERS AND RECTIFIERS

Ralph D. Mershon, New York, N. Y.

Application December 4, 1931, Serial No. 578,992

3 Claims. (Cl. 175—315)

In the operation of electrolytic condensers and rectifiers employing filmed electrodes it has long been known that if a filmed surface is in contact with both a gas and the electrolyte the metal corrodes at the boundary surface between the gas and the liquid. For example a bubble adhering to the filmed surface under the electrolyte will start corrosion, and a filmed lead extending out of the electrolyte into the air space above will corrode at the point where it emerges from the electrolyte. In the case of filmed parts wholly submerged the adherence of bubbles can be prevented by keeping the electrolyte in vigorous circulation so that the bubbles are swept off as fast as they form, but the problem of keeping the filmed leads out of simultaneous contact with air and electrolyte is more difficult since the leads must extend below the surface of the electrolyte for connection with the submerged electrodes and must extend into the air for connection with the external circuit.

I have accordingly been led to devise the present invention, which has for its chief object to provide a simple and inexpensive but thoroughly effective terminal or lead for electrolytic condensers and rectifiers which can extend from the air into the electrolyte without contact with the air at the point where it enters the electrolyte. To this and other ends the invention comprises the novel device and features thereof hereinafter described.

Referring to the accompanying drawing, in which a preferred embodiment of the invention is illustrated:

Figure 1:
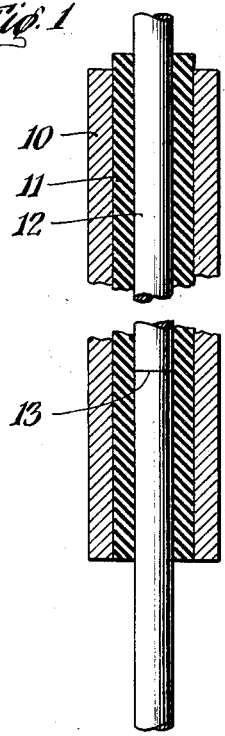
Fig. 1 is a section showing parts of the lead or terminal assembled, ready for the finishing operation.
Figure 2:
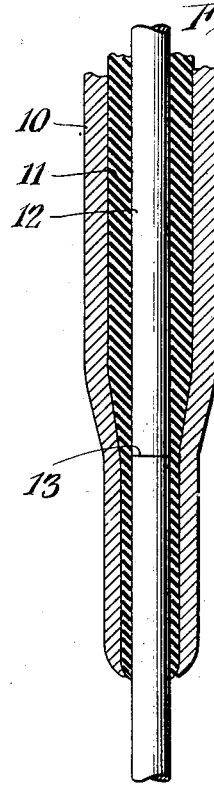
Fig. 2 is a section showing the completed article.

In making my improved lead or terminal I prepare an assembly such as shown in Fig. 1, comprising an outer tube or sheath 10 of aluminum, copper, or other metal which will not harmfully affect the electrolyte. In the outer sheath is a tube 11, of resilient insulating material, as for example celluloid or rubber, and extending through the tube 11 is the conductor 12 by which connection is to be made between the filming electrode or electrodes of the condenser or rectifier and the external circuit. This conductor is preferably a stiff rod, but may be thin enough to be flexible. It may be of filming metal, say aluminum or aluminum alloy, throughout; but if not, then at least the end which is to be connected with the filmed electrode or electrodes must be of filming metal up to a point inside of the insulating tube, say to the point 13, where it may be welded or otherwise suitably joined to the remaining part, which latter may be of any convenient and suitable metal, preferably copper.

Figure 3:
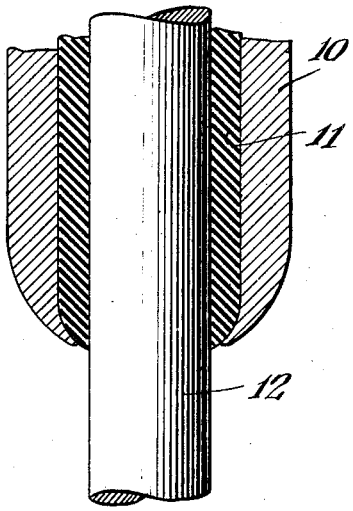
Fig. 3 is a detail sectional view of the lower end of the terminal shown in Fig. 2.

The end of the outer tube or sheath is now spun down firmly on the underlying insulating tube, thereby extending both down along the protruding conductor of filming metal and producing a liquid-tight joint between the conductor and the insulating tube. The pressure thus exerted should be sufficient, with due regard to the resilience of the insulating material, to take care of any greater thermal expansion of the outer sheath than of the conductor, so that when the terminal gets warm or hot, as it usually does when the condenser or rectifier is in use, the joint will not open up and admit electrolyte. If the insulating tube is of rubber the sulfur used in vulcanization tends to contaminate the electrolyte, and to minimize this result it is advantageous to shape the spun end as indicated in Fig. 3, bringing the inner edge of the sheath down close to the conductor, preferably as close thereto as possible without danger of arcing across the insulation. Any insulation extending out of the spun end of the sheath can be trimmed off flush with the sheath.

Figure 4:
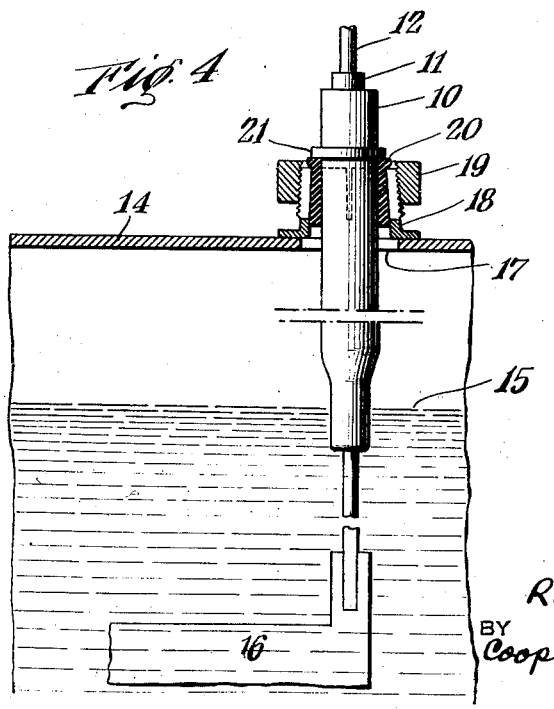
Fig. 4 is a detail sectional view illustrating a convenient method of mounting the terminal on the cover of the tank containing the electrolyte in which the electrodes of the condenser or rectifier are immersed.

For use, it is convenient to mount or support the terminal in the cover of the tank containing the electrolyte. If this cover is of metal in electrical connection with the electrolyte it may in some cases be necessary to insulate the sheath of the terminal, especially when the sheath is made of filming metal and the tank is used as a cathode. For such purpose the terminal may be mounted as in Fig. 4, in which 14 represents the cover of the tank (not shown) containing the electrolyte 15 and the electrode or one of the electrodes, 16, with which the conductor 12 is connected. On the cover, over the opening 17 therein, is a split nipple 18 having a tapered thread engaged by a clamping nut 19 which clamps the bushing 20, of resilient insulating material, down firmly on the terminal. If the grip on the terminal is not sufficient to hold it securely it may be provided with a collar 21 to prevent positively any displacement into the tank.

It is to be understood that the invention is not limited to the form herein specifically described but can be embodied in other forms without departure from its spirit as defined by the following claims.

I claim—

1. In an electrolytic apparatus having an electrolyte, the combination with an electrode submerged in the electrolyte, of a terminal comprising a conductor connected to the electrode at a point submerged in the electrolyte and extending thence out of the electrolyte, an outer tube or sheath of metal around the conductor, and an intermediate layer of resilient insulating material between the conductor and the outer tube, said outer tube and insulating layer terminating at a point submerged in the electrolyte, said outer metallic tube extending continuously along and over a substantial extent of the insulating layer within the electrolyte, and said outer tube being drawn down to form a tube of reduced diameter compressing the insulating layer upon and into liquid-tight contact with the conductor at said submerged point, and at least the part of the conductor extending from the electrode into the compressed insulated layer being of filming metal.

2. A terminal according to claim 1, in which the end of the outer tube or sheath at the exposed portion of the conductor is carried inwardly over the end of the insulating layer to decrease the area of contact between the same and the electrolyte when the terminal is in use.

3. An apparatus according to claim 1, in which the outer tube or sheath is made of copper and the compression of the resilient insulating material is sufficient to prevent opening of the joint between the insulating material and the conductor by thermal expansion of the outer tube.

RALPH D. MERSHON.